United States Patent [19]
Jones et al.

[11] Patent Number: 6,046,118
[45] Date of Patent: Apr. 4, 2000

[54] COMPOSITE SHEET MATERIAL

[75] Inventors: David C. Jones; Stasys K. Rudys, both of Midlothian, Va.

[73] Assignee: E. I. du Pont de Nemours and Company, Wilmington, Del.

[21] Appl. No.: 08/901,301

[22] Filed: Jul. 28, 1997

Related U.S. Application Data

[60] Provisional application No. 60/022,974, Aug. 2, 1996.

[51] Int. Cl.[7] .................................................. B32B 27/02
[52] U.S. Cl. .............................. 442/57; 442/382; 442/389
[58] Field of Search ............................... 442/50, 57, 382, 442/381, 401, 389

[56] References Cited

U.S. PATENT DOCUMENTS

| | | | |
|---|---|---|---|
| 3,169,899 | 2/1965 | Steuber | 161/72 |
| 3,532,589 | 10/1970 | David | 161/150 |
| 4,684,568 | 8/1987 | Lou | 428/265 |
| 4,929,303 | 5/1990 | Sheth | 156/209 |
| 5,013,599 | 5/1991 | Guckert | 428/286 |
| 5,032,442 | 7/1991 | Yamazaki et al. | 428/105 |
| 5,182,162 | 1/1993 | Andrusko | 428/219 |
| 5,290,377 | 3/1994 | Aihara et al. | 156/229 |
| 5,300,345 | 4/1994 | Aihara et al. | 428/137 |
| 5,763,336 | 6/1998 | Jones et al. | 442/382 |

*Primary Examiner*—Terrel Morris
*Assistant Examiner*—Cheryl Juska

[57] ABSTRACT

A breathable composite sheet material includes a first layer of flash-spun polyethylene plexifilamentary film-fibril sheet and a second layer of a thermoplastic open mesh fabric thermally laminated to the first layer. The composite sheet has an average tensile strength and an average grab tensile strength that are each at least 10% greater than the sum of the tensile and grab strengths of the first and second layers. The average tensile strength of the composite sheet after exposure to 400 mJ/m$^2$ of ultraviolet light is at least 65% of the tensile strength of the sheet before any substantial exposure to ultraviolet light.

6 Claims, 2 Drawing Sheets

COMPOSITE SHEET MATERIAL

This application claims the benefit of U.S. provisional application No. 60/022,374 filed on Jul. 29, 1996.

FIELD OF THE INVENTION

This invention relates to a composite sheet material and more particularly to a laminated sheet that is lightweight, strong, durable, and breathable.

BACKGROUND OF THE INVENTION

Sheet material made from cotton canvas has traditionally been used in making protective covers for motor vehicles, boats, and machinery. Canvas covers are strong and relatively durable. However, canvas sheeting suffers from the disadvantages that it is heavy, permeable to water, and subject to rapid degradation when left exposed to sun or moisture.

Lighter weight plastic sheet material made from polymer films has also been used in making protective covers. Unfortunately, most plastic films suffer from the disadvantage that they are not breathable, and therefore, they trap moisture beneath their surface where the moisture can damage the covered item. Plastic films also frequently suffer from the disadvantages that they are easily ripped or torn, and they do not drape well over a covered item.

Protective covers have also been made from nonwoven webs melt extruded from a variety of thermoplastic polymer resins, which webs have been bonded to a reinforcing scrim material. U.S. Pat. No. 5,182,162 discloses protective covers made from a melt extruded nonwoven polyolefin sheet of very uniform thickness that has been thermal bonded to a cross-laminated thermoplastic net-like web. The cross-laminated thermoplastic net-like material of U.S. Pat. No. 5,182,162 adds strength and stability to the nonwoven sheet, but such products do not demonstrate the moisture vapor transmissibility, strength and durability required for many protective cover applications.

Nonwoven sheets made from thermal bonded flash-spun polyethylene webs have been used to make protective covers. Such materials are lightweight, they are moisture vapor permeable, and they do not rot with prolonged exposure to moisture. Nonwoven sheets made from flash-spun polyethylene plexifilamentary fiber webs are disclosed in U.S. Pat. No. 3,169,899. One such commercial sheet material that has been used in automobile storage cover applications is TYVEK® spunbonded olefin sheet material sold by E. I. du Pont de Nemours and Company of Wilmington, Del. ("DuPont"). TYVEK® is a registered trademark of DuPont. TYVEK® sheets, are made from flash-spun polyethylene that has been thermal bonded to form lightweight sheets that have outstanding mechanical properties while also exhibiting good tolerance to ordinary weather conditions. Specifically, TYVEK® sheet material has a high moisture vapor transmission rate, good liquid water permeability resistance, and good tear strength. In addition, because TYVEK® sheet material is made from high density polyethylene, it is readily recyclable. TYVEK® sheet material can also be readily printed with advertising or other information and it can also be laundered repeatedly. Finally, TYVEK® sheet material can be made with additives that make the sheets more resistant to degradation resulting from prolonged exposure to heat or UV radiation.

Although TYVEK® flash-spun polyethylene sheets have been found to exhibit an array of superb physical properties for protective cover applications, such sheet material is not sufficiently strong and durable for certain applications. For example, TYVEK® sheet material ripped when used in protective covers that were applied to boats during highway transit from a factory to a dealership. Also, in applications where covers made from TYVEK® flash-spun polyethylene sheet material were exposed to UV radiation from the sun for extended periods of time, the strength and toughness of the sheets has been found to degrade. Accordingly, there is a need for a lightweight, recyclable, liquid impermeable, moisture vapor permeable sheet material that exhibits a weight, permeability, and moisture vapor transmission rate similar to that of TYVEK® flash-spun polyethylene sheet material, yet also exhibits increased strength, durability, and significantly improved resistance to degradation from exposure to UV radiation.

SUMMARY OF THE INVENTION

The invention provides a breathable composite sheet material. The composite sheet material includes a first layer of flash-spun polyethylene plexifilamentary film-fibril sheet and a second layer of a thermoplastic open mesh fabric. The second layer is thermally laminated to the first layer. The first layer of flash-spun polyethylene plexifilamentary film-fibril sheet has a basis weight of less than 110 $g/m^2$, an Elmendorf tear strength of at least 12 Newtons, and a tensile strength of at least 8.75 N/cm. For certain end use applications, it is preferred that the sheet have a liquid water permeability hydrostatic head of at least 65 cm, and a moisture vapor transmission rate of at least 100 $g/m^2$ in 24 hours. The second layer of thermoplastic open mesh fabric has a basis weight of less than 60 $g/m^2$, an elongation of less than about 30%, an Elmendorf tear strength of at least 2.5 N, and a tensile strength of at least 20 N/cm. The composite sheet has an average tensile strength that is at least 10% greater than the sum of the tensile strengths of the first and second layers, and the composite sheet has an average grab tensile strength that is at least 15% greater than the sum of the grab tensile strengths of the first and second layers.

In the preferred embodiment of the invention, the thermoplastic open mesh fabric of the second layer comprises a cross-laminated net-like web comprising at least 50% by weight polyethylene. It is further preferred that the flash-spun polyethylene plexifilamentary film-fibrils of the first layer include an additive that stabilizes the sheet against degradation caused by exposure to ultraviolet light.

According to the preferred embodiment of the invention, the tensile strength of the composite sheet after exposure to 400 $mJ/m^2$ of ultraviolet light is as least 65% of the tensile strength of the sheet before any substantial exposure to ultraviolet light. Similarly, the tensile strength of the composite sheet of exposure to 800 $mJ/m^2$ of ultraviolet light is as least 50% of the tensile strength of the sheet before any substantial exposure to ultraviolet light. Finally, the percentage of the original tensile strength of the composite sheet the invention that is retained after exposure to 820 $mJ/m^2$ of ultraviolet light, is at least 25% greater than the percentage of the original tensile strength of a piece of flash-spun polyethylene plexifilamentary film-fibril sheet, identical to the first layer of the composite sheet of the invention, that is retained after exposure to 820 $mJ/m^2$ of ultraviolet light.

BRIEF DESCRIPTION OF THE DRAWINGS

The accompanying drawings, which are incorporated in and constitute a part of this specification, illustrate the presently preferred embodiments of the invention and, together with the description, serve to explain the principles of the invention.

DETAILED DESCRIPTION OF THE PREFERRED EMBODIMENTS

Figure 1:
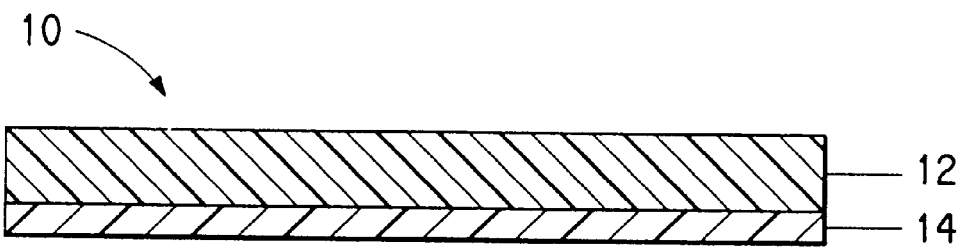
FIG. 1 shows a cross-sectional view of the composite sheet structure of the invention.

Reference will now be made in detail to the presently preferred embodiments of the invention, which are illustrated in the accompanying drawings. Throughout the drawings, like reference characters are used to designate like elements.

Figure 2:
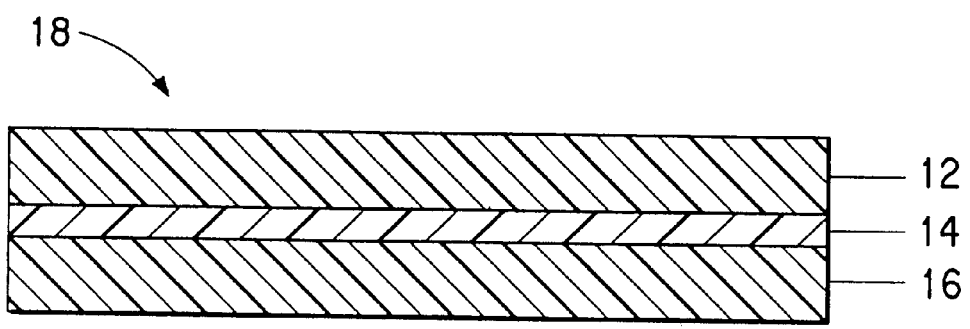
FIG. 2 shows a cross-sectional view of the composite sheet structure according to an alternative embodiment of the invention.

FIG. 1 shows a cross section of the composite sheet of the present invention. The composite sheet 10 is a two layer sheet having a first layer 12 made of a flash-spun polyolefin nonwoven sheet material and a second layer 14 made of a thermoplastic reinforcing scrim material. Layers 12 and 14 are preferably held together by thermal lamination. Alternatively, an adhesive could be used to join layers 12 and 14. According to an alternative embodiment of the invention shown in FIG. 2, the invention may comprise a three layer sheet 18 having a layer of thermoplastic reinforcing scrim material 14 bonded between outer layers 12 and 16, that are each made of spunbonded nonwoven sheet material. The layers of the composite sheet of FIG. 2 are preferably bonded to each other in the same manner as the layers of the composite sheet of FIG. 1.

According to the invention, the layer 12 of the composite sheet 10 (FIG. 1) and the outer layers 12 and 16 of the composite sheet 18 (FIG. 2) are comprised of a spunbonded polyolefin sheet material. For certain end use applications, such as protective covers, layers 12 and 16 should be vapor-permeable (i.e., the sheet should have a water vapor transmission rate of at least 100 g/m$^2$ in 24 hours according to ASTM standard E96, method B). When the composite sheet material is to be used in protective covers, it is also important that sheet layers 12 and 16 have a low liquid permeability (i.e., the sheet should have a liquid water permeability resistance expressed by a hydrostatic head pressure of at least 65 cm according to AATCC standard 127). Layers 12 and 16 preferably have a thickness of between 0.08 and 0.35 mm and a basis weight of less than 110 g/m$^2$ (3.25 oz/yd$^2$). Preferably sheets 12 and 16 have a tensile strength of at least 8.75 Newtons/cm (5 lbs/in) measured according to ASTM 1682, Section 19. It is also preferred that sheets 12 and 16 be inert to the surfaces of most items that might be covered.

Particularly well suited for layer 12 of composite sheet 10 (FIG. 1) and layers 12 and 16 of composite sheet 18 (FIG. 2) are sheets of spunbonded nonwoven polyolefin film-fibrils of the type disclosed in U.S. Pat. Nos. 3,169,899 and 3,532,589, the contents of which are both incorporated by reference herein. A commercial spunbonded nonwoven polyethylene film-fibril sheet product that is particularly suitable to the composite sheet of the invention is TYVEK® flash-spun polyethylene plexifilamentary film-fibril sheet. As discussed above, TYVEK® sheet is flexible, lightweight, strong and vapor permeable. TYVEK® sheet also has a very low abrasiveness, it is inert to most painted surfaces, and it can be made resistant to UV degradation.

One preferred sheet product for use in the invention is TYVEK® 1461-L sheet, due to its advantageous moisture vapor transmission rate which has been measured using ASTM E-96, method B to be between 600 and 1100 g/m$^2$ in 24 hrs. TYVEK® 1461-L sheet is also substantially water impermeable; it has a hydrostatic head of between 122 and 151 cm. TYVEK® 1461-L sheet has a thickness of between 0.1 and 0.25 mm and a basis weight of about 59 g/m$^2$ (1.74 oz/yd$^2$). TYVEK® 1461-L has an Elmendorf tear strength of between 14.1 and 15.7 Newtons and a tensile strength of about 25 N/cm. TYVEK® 1461-L sheet is made of high density polyethylene, which makes it both readily recyclable and inert to most painted surfaces. In addition, TYVEK® 1461-L sheet can be readily printed with advertising or other information and it can also be laundered repeatedly.

In order to improve the resistance of TYVEK® sheet material to UV degradation, a UV stabilizer may be added to the polyethylene from which TYVEK® 1461-L sheet is flash-spun. One UV stabilizer that has been employed to stabilize TYVEK® sheets against UV degradation is the hindered amine stabilizer Tinuvin 622 made by Ciba-Geigy of Hawthorn, N.Y. Antioxidants (such as Irganox 1010 also made by Ciba-Geigy) and acid neutralizers (such as calcium stearate) can also be added to the sheet in order to reduce degradation during extended weathering. Hydroxylamine stabilizers may also employed to stabilize TYVEK® sheets against UV degradation.

TYVEK® sheet material is especially well suited for layers 12 and 16 of the composite sheet because TYVEK® sheet has been found to be less abrasive than many other synthetic materials used in making covers. For example, when a sheet of TYVEK® was used as the abrading surface in a standard crock meter and was rubbed 100 times against a painted automobile panel under a pressure 81 kPa, no scratches were observed. The steel vehicle panel used in the test was painted with one coat of Centari® black color non-metallic paint (Reference No. 872-AB921) and with one coat of Generation 3® clear coat (Reference No. RK7103). Centari® and Generation 3® are registered trademarks for products of DuPont. When similar sheets of Nylon and of a polyester-cotton blend were applied to the same surface using the same procedure, significant scratching was observed. When a microporous film was used as the abrading surface according to the same test procedure, hairline scratches were also observed.

The reinforcing layer 14 of the composite sheets 10 and 18 is comprised of a flexible, highly porous, reinforcing scrim material that, for recycling purposes, is preferably made of the same polyolefin as the layer 12 of the sheet 10 (FIG. 1) or the layers 12 and 16 of the sheet 18 (FIG. 2). The reinforcing scrim material may be a cross-laminated open mesh fabric that is at least 25% open, and has a thickness in the range of 0.07 mm to 0.25 mm. The preferred reinforcing material has a basis weight in the range of 15 g/m$^2$ (0.44 oz/yd$^2$) to 60 g/m$^2$ (1.77 oz/yd$^2$), an Elmendorf tear strength of at least 2.5 Newtons, a tensile strength of at least 20 N/cm (11.4 lbs/in), and an elongation of less than about 30%. A scrim material that has been found especially suitable for use in the composite sheet of the invention is a cross-laminated reinforcing scrim material that is sold under the name CLAF® by Amoco Nisseki CLAF, Inc. of Atlanta, Ga., and is more fully described in U.S. Pat. No. 5,182,162, which is hereby incorporated by reference. CLAF® is made from polyethylene film that has been fibrillated with resulting fibers spread in two transverse directions at a strand count of 2 to 4 strands per centimeter. The spread fibers are cross-laminated by heat to produce a nonwoven open mesh fabric with a thickness of 75 to 125 microns and with substantially equivalent strength in the machine and cross directions. The polyethylene fibers of the reinforcing material preferably include a polymer, such as low density polyethylene, that has a lower melting temperature than the polyethylene of the flash-spun polyethylene in layers 12 and 16. CLAF® is a registered trademark of Nippon Petrochemicals Company, Ltd.

Figure 3:
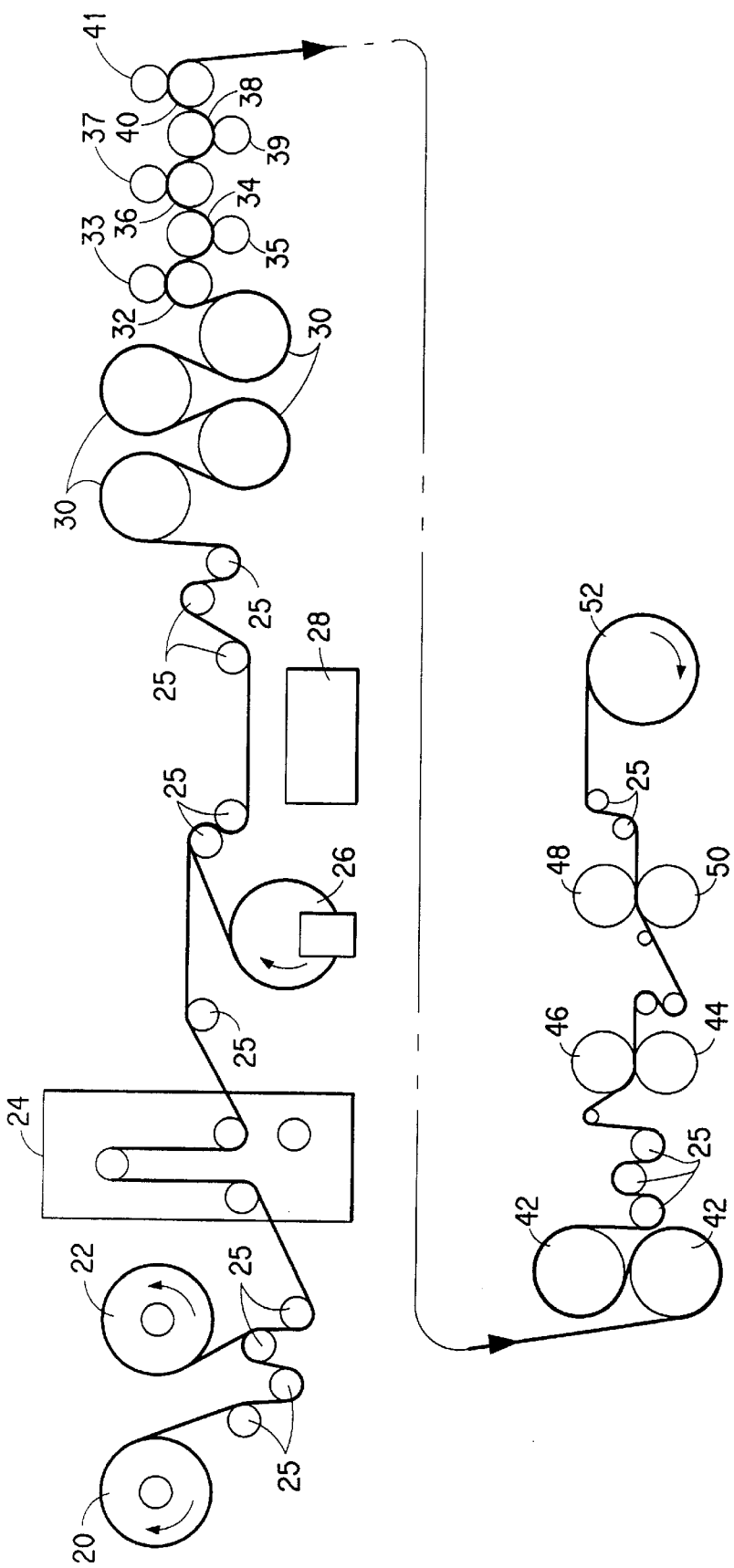
FIG. 3 is a schematic representation of the process by which the sheets of FIGS. 1 and 2 can be made.

The flash-spun polyethylene sheet layer 12 and the reinforcing material layer 14 can be thermally laminated by any conventional means, as for example, the small roll bonding process shown in FIG. 3. As shown in FIG. 3, a sheet of a flash-spun polyethylene sheet material fed from a feed roll 22 is rolled on top of a sheet of reinforcing scrim material fed from a feed roll 20. The two layers are carried by transfer rolls 25 to a sheet tensioning machine 24. If a trilaminate sheet structure, like that shown in FIG. 2, is desired, a second sheet of flash-spun polyethylene from a feed roll 26 may be layered against the underside of the layer of the reinforcing material. The layered sheet structure may be passed over a light table 28 to enable visual inspection for gross defects before being carried to bonding equipment.

Prior to bonding, the layered sheet preferably passes over preheating rolls 30 that are maintained at a temperature of 110 to 125° C. The preheated sheet is next passed over smaller diameter bonding rolls 32, 34, 36, 38, and 40. Preferably, the diameter of each of the bonding rolls 32, 34, 36, 38 and 40 is in the range of 19 to 21 cm. Slightly smaller unheated rubber rolls 33, 35, 37, 39 and 41 each apply a nip pressure of 35 to 40 psi to the composite sheet as it passes over a corresponding bonding roll. Preferably, the composite sheet passes over the bonding rolls at an average speed of between about 46 and 122 m/min (150 and 400 ft/min). The bonding rolls 32, 34, 36, and 38 are maintained at a temperature sufficient to raise the temperature of the surface of the reinforcing scrim material to its melting temperature. A roll temperature of about 127° C. (260° F.) has been found to work effectively for good thermal bonding between the layers 12 and 16 of a flash-spun polyethylene sheet material and a reinforcing layer 14 of a cross-laminated, thermoplastic, polyethylene reinforcing scrim material. The rolls alternately contact opposite sides of the composite sheet in order to achieve uniform heating and bonding. The last bonding roll 40 is preferably not heated.

The bonded sheet may, at this point, be stabilized by passing each side of the sheet over larger diameter chilled rolls 42. After coming off the chilled rolls, the bonded sheet may be collected or it may be run through embossing equipment if a pattern is desired on the finished sheet. In the embodiment of the invention shown in FIG. 3, the sheet is embossed, in the manner known in the art. According to the process shown, embossing is performed by the heated embossing rolls 46 and 50 and corresponding backup rolls 44 and 48. The finished composite sheet may be subsequently carried by transport rolls 25 to a collection roll 52.

However, if a greater degree of bonding is desired, the rolls 42 may be operated at ambient temperature and the embossing section can be utilized for additional bonding. In making the preferred composite sheet of the invention, the embossing rolls were operated at a temperature of about 138° C. (280° F.) and a nip pressure of about 55 psi was applied between the two embossing rolls 46 and 50 and the corresponding backup rolls 44 and 48.

The composite sheet of the invention has been found to exhibit unexpectedly high strength. In the tests reported in the examples below, the grab tensile strength in the machine direction of a two layer composite sheet like that shown in FIG. 1 was found to be as much as 30% to 50% greater than the sum of the grab tensile strengths of the individual component layers of the composite sheet. Only a slightly less dramatic synergistic effect was observed in the cross direction. Likewise, the grab tensile strength of a three-layer composite sheet like that shown in FIG. 2 was found to be 51% greater in the machine direction and 33% greater in the cross direction than the sum of the grab tensile strengths of the component layers of the three layer composite sheet structure measured in the same direction. Moreover, when exposed to UV radiation, the composite sheets 10 and 18 retained at least 25% more of their original strength than did the sheet material used in layers 12 and 16 at an equivalent amount of UV exposure.

EXAMPLES

In the description above and in the non-limiting examples that follow, the following test methods were employed to determine various reported characteristics and properties. ASTM refers to the American Society for Testing and Materials, and AATTC refers to the American Association of Textile Chemists and Colorists.

Basis Weight was determined by ASTM D-3776, which is hereby incorporated by reference, and is reported in $g/m^2$. The basis weights reported for the examples below are each based on an average of at least twelve measurements made on the sample.

Tensile Strength and Work to Break were determined by ASTM D-1682, Section 19, which is hereby incorporated by reference, with the following modifications. In the test, a 2.54 cm by 20.32 cm (1 inch by 8 inch) sample was clamped at its opposite ends. The clamps were attached 12.7 cm (5 in) from each other on the sample. The sample was pulled steadily at a speed of 5.08 cm/min (2 in/min) until the sample broke. The force at break was recorded Newtons/cm as the breaking tensile strength. The area under the stress-strain curve was the work to break.

Grab Tensile Strength was determined by ASTM D 1682, Section 16, which is hereby incorporated by reference, and is reported in Newtons.

Hydrostatic Head measures the resistance of a sheet to the penetration by liquid water under a static load. A 316 $cm^2$ sample is mounted in an SDL Shirley Hydrostatic Head Tester (manufactured by Shirley Developments Limited, Stockport, England). Water is pumped against one side of a 102.6 $cm^2$ section of the sample until the sample is penetrated by water. The measured hydrostatic pressure is reported in centimeters of water. The test generally follows AATTC 127-1985, which is hereby incorporated by reference. The hydrostatic head values reported for the examples below are each based on an average of at least six measurements made on the sheet.

Moisture Vapor Transmission Rate (MVTR) is determined by ASTM E96, Method B, which is hereby incorporated by reference, and is reported in $g/m^2/24$ hr.

Example 1

In this example, TYVEK® 1461-L spunbonded polyethylene sheet (Layer A) with a basis weight 59 $g/m^2$ (1.74 $oz/yd^2$) and a point-bonded soft structure was thermally laminated to a sheet of CLAF® HS3301 cross-laminated polyethylene reinforcing scrim material (Layer B). CLAF® HS 3301 is a double warp web with a basis weight of about 35.6 $g/m^2$ (1.05 $oz/yd^2$) that is sold by Amoco Nisseki CLAF, Inc. of Atlanta, Ga. Layers A and B were thermally laminated by the process shown in FIG. 3 and described above with respect to FIG. 3, except that the roll 26 (FIG. 3) was not used to provide a third layer to the composite sheet structure. The sheets were bonded at a line speed of about 350 ft/min over thermal bonding rolls maintained at a temperature of about 127° C. (260° F.). The nip pressures on the bonding rolls was maintained at about 40 psi and the nip pressure on the embossing rolls was maintained that about 55 psi. The tensile strength, the work to break, the grab tensile strength, and the hydrostatic head of individual Layers A and B, and of the composite sheet A/B were measured and are reported in Table 1, below.

TABLE 1

|  | A | B | A + B | A/B Laminate | Synergy |
|---|---|---|---|---|---|
| Tensile MD (N/cm) | 23.5 | 30.7 | 54.2 | 74.1 | 36% |
| Tensile CD (N/cm) | 30.2 | 31.8 | 62.0 | 60.3 | −3% |
| Work to Break MD (Nm) | 0.6 | 0.9 | 1.5 | 2.1 | 40% |
| Work to Break CD (Nm) | 1.1 | 1.2 | 2.3 | 2.5 | 9% |
| Grab Tensile MD (N) | 151.1 | 158.5 | 309.6 | 412.1 | 33% |
| Grab Tensile CD (N) | 203.6 | 154.2 | 357.8 | 424.9 | 19% |
| Hydrostatic Head (cm) | 137.7 | (no barrier) | 137.7 | 139.5 |  |
| MVTR (g/m²/day) | 844 | (no barrier) | 844 | 975 |  |

Example 2

In this example, TYVEK® 1461-L spunbonded polyethylene sheet (Layer A) with a basis weight 59 g/m² (1.74 oz/yd²) and a point-bonded soft structure was thermally laminated to a sheet of CLAF® HS 1310 cross-laminated polyethylene reinforcing scrim material (Layer B). CLAF® HS 1310 is a double warp web with a basis weight of about 35.6 g/m² (1.05 oz/yd²) that is sold by Amoco Nisseki CLAF, Inc. of Atlanta, Ga. Layers A and B were thermally laminated in a heated nip as follows. Layer B was preheated by "S" wrapping it over four preheat rolls maintained at 129° C. while Layer A was preheated by "S" wrapping it over two preheating rolls maintained at 135° C. The preheated Layers A and B were fed into a three roll stack calendar section consisting of a bottom and a middle steel roll each maintained at a temperature between 132° and 141° C. and a top rubber roll with a durometer hardness of about Shore A 80. Preheated Layer B was "S" wrapped around the steel rolls and preheated Layer A was fed directly into the nip formed between the top rubber roll and the steel middle roll. Layers A and B were joined in the nip between the top rubber roll and the middle steel roll, which nip is maintained at a pressure of 400 psi. After exiting the nip, the laminate of Layers A and B were "S" wrapped around two chilled rolls maintained at about 18° C. The tensile strength, the work to break, the grab tensile strength, and the hydrostatic head of individual Layers A and B, and of the composite sheet A/B were measured and are reported in Table 2, below.

TABLE 2

|  | A | B | A + B | A/B Laminate | Synergy |
|---|---|---|---|---|---|
| Tensile MD (N/cm) | 23.5 | 35.9 | 59.4 | 71.1 | 20% |
| Tensile CD (N/cm) | 30.2 | 36.1 | 66.3 | 74.8 | 13% |

TABLE 2-continued

|  | A | B | A + B | A/B Laminate | Synergy |
|---|---|---|---|---|---|
| Work to Break MD (Nm) | 0.6 | 1.1 | 1.7 | 1.9 | 12% |
| Work to Break CD (Nm) | 1.1 | 1.5 | 2.6 | 2.5 | −4% |
| Grab Tensile MD (N) | 151.1 | 119.7 | 270.8 | 405.2 | 50% |
| Grab Tensile CD (N) | 203.6 | 149.9 | 353.5 | 463.9 | 31% |
| Hydrostatic Head (cm) | 137.7 | (no barrier) | 137.7 | 173.2 |  |
| MVTR (g/m²/day) | 844 | (no barrier) | 844 | 587 |  |

Example 3

In this example, Layer A was a sheet of TYVEK® 1056-P spunbonded polyethylene sheet with a basis weight 54.3 gr/m² (1.6 oz/yd²), that had been whole surface bonded to obtain a paper-like hard structure, and had been treated with a wetting agent to improve the sheet's performance as a printing medium. Layer A was thermally laminated to a sheet of CLAF® S 1510 cross-laminated polyethylene reinforcing scrim material (Layer B). CLAF® S 1510 is a single warp web with a basis weight of about 23.1 g/m² (0.68 oz/yd²) that is sold by Amoco Nisseki CLAF, Inc. of Atlanta, Ga. Layers A and B were thermally laminated by the process described in Example 1. The tensile strength, the work to break, and the grab tensile strength of individual Layers A and B, and of the composite sheet A/B were measured and are reported in Table 3, below.

TABLE 3

|  | A | B | A + B | A/B Laminate | Synergy |
|---|---|---|---|---|---|
| Tensile MD (N/cm) | 44.7 | 18.9 | 63.6 | 75.8 | 19% |
| Tensile CD (N/cm) | 46.7 | 30.6 | 77.2 | 89.3 | 16% |
| Work to Break MD (Nm) | 1.3 | 0.6 | 1.9 | 2.6 | 37% |
| Work to Break CD (Nm) | 1.5 | 1.2 | 2.7 | 4.3 | 59% |
| Grab Tensile MD (N) | 261.5 | 96.7 | 358.2 | 376.1 | 5% |
| Grab Tensile CD (N) | 360.9 | 91.4 | 452.3 | 540.2 | 19% |

Example 4

In this example, Layer A was a sheet of TYVEK® 1070-P spunbonded polyethylene sheet with a basis weight 67.8 gr/m² (2.0 oz/yd²), that had been whole surface bonded to obtain a paper-like hard structure, and had been treated with a wetting agent to improve the sheet's performance as a printing medium. Layer A was thermally laminated to a sheet of CLAF® S 1510 cross-laminated polyethylene reinforcing scrim material (Layer B). CLAF® S 1510 is a single warp web with a basis weight of about 23.1 g/m² (0.68 oz/yd²) that is sold by Amoco Nisseki CLAF, Inc. of Atlanta, Ga. Layers A and B were thermally laminated by the process of Example 1. The tensile strength, the work to break, and the grab tensile strength of individual Layers A and B, and of the composite sheet A/B were measured and are reported in Table 4, below.

TABLE 4

|  | A | B | A+B | A/B Laminate | Synergy |
|---|---|---|---|---|---|
| Tensile MD (N/cm) | 67.5 | 18.9 | 86.4 | 95.6 | 11% |
| Tensile CD (N/cm) | 72.0 | 30.6 | 102.6 | 110.1 | 7% |
| Work to Break MD (Nm) | 2.4 | 0.6 | 3.0 | 3.3 | 10% |
| Work to Break CD (Nm) | 3.3 | 1.2 | 4.5 | 5.2 | 16% |
| Grab Tensile MD (N) | 394.7 | 96.7 | 491.4 | 559.1 | 14% |
| Grab Tensile CD (N) | 433.2 | 91.4 | 524.6 | 648.5 | 24% |

Example 5

In this example, a trilaminate composite sheet was assembled from a sheet of CLAF® HS3301 cross-laminated polyethylene reinforcing scrim material (Layer B) that was thermally laminated between two sheets of TYVEK® 1461-L spunbonded polyethylene sheet (Layers A and A) with a basis weight 59 gr/m$^2$ (1.74 oz/yd$^2$). CLAF® HS3301 is a double warp web with a basis weight of about 35.6 g/m$^2$ (1.05 oz/yd$^2$) that is sold by Amoco Amoco Nisseki CLAF, Inc. of Atlanta, Ga. Layers A and B were thermally laminated by the process shown in FIG. 3 and described above with respect of FIG. 3. The sheets were bonded at a line speed of about 200 ft/min over thermal bonding rolls maintained at a temperature of about 127® C. (260® F.). The nip pressures on the bonding rolls was maintained at about 35 psi and the nip pressure on the embossing rolls was maintained that about 55 psi. The tensile strength, the work to break, and the grab tensile strength of individual Layers A and B, and of the composite sheet A/B/A were measured and are reported in Table 5, below.

TABLE 5

|  | A (2 Layers) | B | A + B + A | A/B/A Laminate | Synergy |
|---|---|---|---|---|---|
| Tensile MD (N/cm) | 47.1 | 30.7 | 77.8 | 106.1 | 36% |
| Tensile CD (N/cm) | 60.3 | 31.8 | 92.1 | 127.5 | 38% |
| Work to Break MD (Nm) | 1.2 | 0.9 | 2.1 | 3.3 | 57% |
| Work to Break CD (Nm) | 2.2 | 1.2 | 3.4 | 5 | 47% |
| Grab Tensile MD (N) | 302.2 | 158.5 | 460.7 | 694.6 | 51% |
| Grab Tensile CD (N) | 406.6 | 154.2 | 560.8 | 768.2 | 37% |
| Hydrostatic Head (cm) | 137.7 | (no barrier) | 137.7 | 189 |  |
| MVTR (g/m$^2$/day) | 844 | (no barrier) | 844 | 677 |  |

Example 6

In this example, the tensile strength of a sheet of TYVEK® 1461-L spunbonded polyethylene sheet was measured after exposures to various amounts of Ultraviolet radiation. The TYVEK® 1461-L sheet tested had a basis weight of 59 gr/m$^2$ (1.74 oz/yd$^2$) and it was manufactured to include the following stabilizer additives: about 1300 ppm of the antioxidant Irganox 1010, about 500 ppm of the anti-acid calcium stearate, and about 3000 ppm of the hindered amine stabilizer Tinuvin 622. Irganox 1010 is Tetrakis[methylene(3,5-di-tert-butyl-4-hydroxyhydrocinnamate)] methane manufactured by Ciba-Geigy of Hawthorn, N.Y. Tinuvin 622 is an oligomer of dimethyl succinate and N-b-hydroxyethane-2,2,6,6-tetramethylpiperidine (also called 4-hydroxy-2,2,6,6-tetramethyl-1-piperidineethanol) manufactured by Ciba-Geigy. Sheet samples measuring 2.54 cm by 20.32 cm (1 inch by 8 inch) were mounted on an EMMAQUA® sun-tracking exposure machine that measured the amount of UV radiation to which the samples were exposed. EMMAQUA® is a registered trademark of Atlas Weathering Services. At each exposure level listed in the table below, eight samples were removed from the exposure machine for tensile strength testing according to the testing method described above. The average tensile strength at each level of exposure and the degree of degradation are reported in Table 6, below.

TABLE 6

| Exposure MJ/m$^2$ | Tensile (N/cm) | Degradation (%) |
|---|---|---|
| 0 | 23.0 | 0 |
| 140 | 15.0 | 35 |
| 280 | 13.8 | 40 |
| 420 | 10.0 | 57 |
| 560 | 7.2 | 69 |
| 700 | 9.8 | 57 |
| 840 | 8.3 | 64 |

Example 7

In this example, the composite sheet of the TYVEK® 1461-L spunbonded polyethylene sheet described in Example 6 was thermally laminated to a sheet of CLAF® HS 3301 cross-laminated polyethylene reinforcing scrim material according to the process described in Example 1. Samples of the sheet were exposed to UV radiation and tested for tensile strength according to the procedure described in Example 6. The results are reported in Table 7, below.

TABLE 7

| Exposure MJ/m$^2$ | Tensile (N/cm) | Degradation (%) |
|---|---|---|
| 0 | 74.1 | 0 |
| 140 | 55.3 | 25 |
| 280 | 54.4 | 27 |
| 420 | 55.3 | 25 |
| 560 | 41.8 | 44 |
| 700 | 49.8 | 33 |
| 840 | 46.9 | 37 |

Example 8

In this example, a composite sheet comprised of a sheet of CLAF® HS 3301 cross-laminated polyethylene reinforcing scrim material was thermally laminated between two sheets of TYVEK® 1461-L spunbonded polyethylene sheet according to the thermal bonding process described in Example 5. Samples of the sheet were exposed to UV radiation and tested for tensile strength according to the procedure described in Example 6. The results are reported in Table 8, below.

TABLE 8

| Exposure MJ/m$^2$ | Tensile (N/cm) | Degradation (%) |
|---|---|---|
| 0 | 98.8 | 0 |
| 140 | 101.9 | −3 |
| 280 | 87.3 | 12 |
| 420 | 91.6 | 7 |
| 560 | 87.8 | 11 |

TABLE 8-continued

| Exposure MJ/m$^2$ | Tensile (N/cm) | Degradation (%) |
|---|---|---|
| 700 | 82.3 | 17 |
| 840 | 79.5 | 19 |

The composite sheet material material of the invention is a laminated sheet that is lightweight, strong, durable, and breathable. The composite sheet material of the invention is especially useful in end use applications such as protective covers such as vehicle covers and printing media such as the material on which outdoor banners are printed. It will be apparent to those skilled in the art that modifications and variations can be made in the composite sheet of this invention. The invention in its broader aspects is, therefore, not limited to the specific details or the illustrative examples described above. Thus, it is intended that all matter contained in the foregoing description, drawings and examples shall be interpreted as illustrative and not in a limiting sense.

We claim:

1. A breathable composite sheet material comprising:
a first layer of a flash-spun polyethylene plexifilamentary film-fibril sheet material having a basis weight of less than 110 g/m$^2$, an Elmendorf tear strength of at least 12 Newtons, and a tensile strength of at least 8.75 N/cm;
a second layer of a thermoplastic open mesh fabric having a basis weight of less than 60 g/m$^2$, an elongation of less than about 30%, an Elmendorf tear strength of at least 2.5 N, and a tensile strength of at least 20 N/cm, said second layer being thermally laminated to said first layer;
said composite sheet having an average tensile strength that is at least 10% greater than the sum of the tensile strength of the first and second layers, and having a tensile strength, as measured in both machine and cross directions, that is greater than the sum of the tensile strengths of the first and second layers, and
said composite sheet having average grab tensile strength that is at least 10% greater than the sum of the grab tensile strength of the first and, second layers, and having a grab tensile strength, as measured in both machine and cross directions, that is greater than the sum of the grab tensile strengths of the first and second layers.

2. The composite sheet material of claim 1 wherein said first layer has a liquid water permeability hydrostatic head of at least 65 cm, and a moisture vapor transmission rate of at least 100 g/m$^2$ in 24 hours.

3. The composite sheet material of claim 1, wherein said thermoplastic open mesh fabric of said second layer comprises a cross-laminate scrim comprising at least 50% by weight polyethylene.

4. The composite sheet material of claim 1 wherein said flash-spun polyethylene plexifilamentary film-fibrils of the first layer include an additive that stabilizes the sheet against degradation caused by exposure to ultraviolet light and wherein the tensile strength of the composite sheet after exposure to 400 mJ/m$^2$ of ultraviolet light is at least 65% of the tensile strength of the sheet before any substantial exposure to ultraviolet light.

5. The composite sheet material of claim 4 wherein the tensile strength of the composite sheet after exposure to 800 mJ/m$^2$ of ultraviolet light is as least 50% of the tensile strength of the sheet before any substantial exposure to ultraviolet light.

6. The composite sheet material of claim 5 wherein the percentage of the tensile strength of the composite sheet measured before exposure to ultraviolet light that is retained after exposure to 820 mJ/m$^2$ of ultraviolet light, is at least 25% greater than the percentage of the tensile strength of a piece of flash-spun polyethylene plexifilamentary film-fibril sheet, identical to the sheet material of the first layer of the composite sheet, that is retained after exposure to 820 mJ/m$^2$ of ultraviolet light.

* * * * *